US009379985B2

(12) United States Patent
Rhee et al.

(10) Patent No.: US 9,379,985 B2
(45) Date of Patent: Jun. 28, 2016

(54) METHOD OF REDUCING NETWORK TRAFFIC

(75) Inventors: Jong Myung Rhee, Gyeonggi-do (KR); Saad Allawi Nsaif, Gyeonggi-do (KR)

(73) Assignee: Myongji University Industry and Academia Cooperation Foundation, Yongin-si, Gyeonggi-do (KR)

( * ) Notice: Subject to any disclaimer, the term of this patent is extended or adjusted under 35 U.S.C. 154(b) by 24 days.

(21) Appl. No.: 14/377,510

(22) PCT Filed: Apr. 23, 2012

(86) PCT No.: PCT/KR2012/003119
§ 371 (c)(1),
(2), (4) Date: Aug. 8, 2014

(87) PCT Pub. No.: WO2013/122288
PCT Pub. Date: Aug. 22, 2013

(65) Prior Publication Data
US 2015/0003241 A1  Jan. 1, 2015

(30) Foreign Application Priority Data

Feb. 17, 2012  (KR) .......................... 10-2012-0016218
Apr. 13, 2012  (KR) .......................... 10-2012-0038375

(51) Int. Cl.
*H04L 12/801*  (2013.01)
*H04L 12/42*  (2006.01)
(Continued)

(52) U.S. Cl.
CPC .......... *H04L 47/13* (2013.01); *H04L 12/40176* (2013.01); *H04L 12/42* (2013.01); *H04L 12/437* (2013.01); *H04L 47/32* (2013.01); *H04L 2012/421* (2013.01)

(58) Field of Classification Search
CPC ....... H04L 47/13; H04L 12/437; H04L 47/32; H04L 12/54; H04L 12/28; H04L 12/42
USPC .............. 370/229, 230, 230.1, 231, 235, 237, 370/351, 389, 390, 428, 464, 465, 473; 455/403, 422.1
See application file for complete search history.

(56) References Cited

U.S. PATENT DOCUMENTS 5,781,545 A      7/1998  Matthew
2004/0042418 A1*  3/2004  Hamada et al. ............... 370/256
(Continued)

FOREIGN PATENT DOCUMENTS

JP      H01255340 A    10/1989
JP      2009118472 A    5/2009
WO      WO 2010/010120    1/2010

OTHER PUBLICATIONS

Hubert Kirrmann et al., "Seamless and low-cost redundancy for Substation Automation Systems (High availability Seamless Redundancy, HSR)", Power and Energy Society General Meeting, 2011 IEEE, Jul. 24-29.
(Continued)

*Primary Examiner* — Obaidul Huq
(74) *Attorney, Agent, or Firm* — Rabin & Berdo, P.C.

(57) ABSTRACT

The present invention relates to a method of reducing traffic in various network structures. The method of reducing the traffic includes: receiving a first frame copy by means of a next node; receiving a second frame copy by means of the next node; and discarding one received later among the first frame copy and the second frame copy by means of the next node.

10 Claims, 7 Drawing Sheets

(51) Int. Cl.
*H04L 12/823* (2013.01)
*H04L 12/437* (2006.01)
*H04L 12/40* (2006.01)

(56) References Cited

U.S. PATENT DOCUMENTS

| | | | |
|---|---|---|---|
| 2011/0029687 A1* | 2/2011 | Kirrmann et al. | 709/236 |
| 2011/0116508 A1 | 5/2011 | Kirrmann | |
| 2012/0120949 A1* | 5/2012 | Raghuraman et al. | 370/389 |
| 2012/0300611 A1* | 11/2012 | DeCusatis et al. | 370/216 |

OTHER PUBLICATIONS

Hubert Kirrmann et al., "HSR: Zero recovery time and low-cost redundancy for Industrial Ethernet (High availability Seamless Redundancy, IEC 62439-3)" Emerging Technologies & Factory Automation, 2009, ETFA 2009, IEEE Conference, Sep. 22-25.
International Search Report of PCT/KR2012/003119 mailed on Feb. 25, 2013.
Supplementary Partial European Search Report (Application No. of EP 12 86 8756).
Japanese Office Action (2014-551176).

* cited by examiner

METHOD OF REDUCING NETWORK TRAFFIC

TECHNICAL FIELD

The present invention is directed to a method of reducing traffic in various structural types of network, especially the method of reducing traffic in Ethernet networks using standard HSR (High-availability Seamless Redundancy).

BACKGROUND ART

No previous works have been performed regarding the techniques for reducing traffic in a network using redundancy protocol. Especially, there were no methods for efficiently reducing traffic in the network using standard HSR.

DISCLOSURE

Technical Problem

The object of the present invention is to provide the method for reducing traffic in a ring or matrix type of network.

Technical Solution

To achieve this object, the method of reducing traffic in the network according to one embodiment of the invention can comprise the steps of a next node receiving a first frame copy; the next node receiving a second frame copy; and the next node removing the frame copy received later of the first frame copy and the second frame copy.

To achieve this object, the method of reducing traffic in the network according to another embodiment of the invention can comprises the steps of a next node receiving a first frame copy; the next node receiving a second frame copy; the next node removing the first frame copy when the first frame copy has an error; and the next node forwarding the second frame copy to its adjacent node.

To achieve this object, the method of reducing traffic in the network according to further embodiment of the invention can comprises the steps of a next node receiving a first frame copy among nodes designated as a particular group; and the next node forwarding the first frame copy to adjacent nodes which are members in the particular group, wherein the next node does not forward the first frame copy to any adjacent nodes which is not a member in the particular group.

Advantageous Effects

In this method of network traffic reduction according to the present invention, only one of frame copies is received by nodes and thus redundant frame copies are removed and are not transmitted and/or received, resulting in improvement of network traffic performance.

Figure 1:
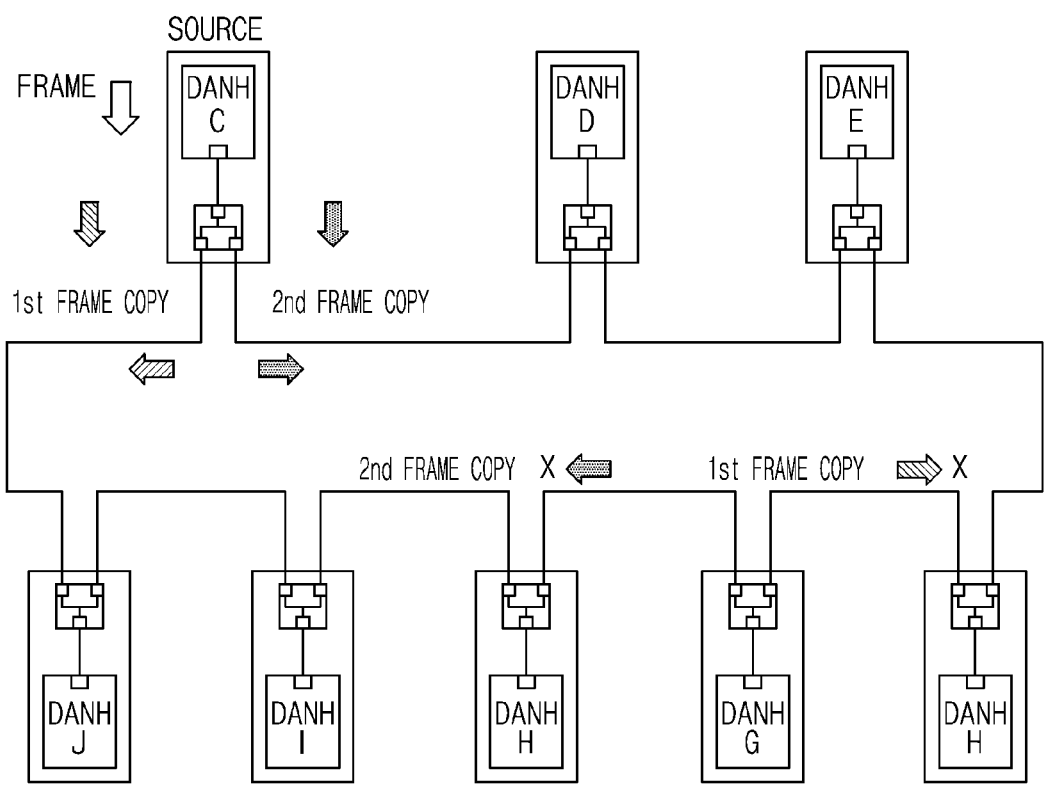
FIG. 1 shows a schematic diagram of the network system according to the first embodiment of the invention.

[Description of the Reference Numerals in the Drawings]
200, 300: source node 302, 304: first node (distribution node)

BEST MODE

The embodiments of the present invention are described in detail hereinafter, referring to accompanying drawings.

The network traffic reduction method of the present invention relates to a method for reducing traffic (load) in various networks, as frames or frame copies are forwarded or received and especially provided is the traffic reduction method when the frame copies are tranceived. The networks according to the present invention can be various types of network, such as Ethernet. Particularly, the present invention provides the method of reducing traffic in the ring or matrix types of network.

Frame copies are generated and circulated inside the network using redundancy protocol, dual system, etc. For example, in a network system where nodes are in dual, i.e. connected through two channels, the frame copies are sent in advance to the nodes through the channels. Thus, if the frame copies are forwarded in advance, when there is an error in one of the two channels, connections among the nodes can be resumed with zero recovery time through the other channel that has no error. The system is not limited to the particular one as long as the nodes can forward and/or receive frames/frame copies.

Although the present invention can be applied to various types of network, specific details are set forth here for Ethernet networks using standard HSR. Also the network system of the present invention will be compared to a conventional network system using standard HSR. Herein, HSR means a redundancy protocol, i.e. a system in which duplicated copies of sent frames are forwarded to other nodes in the network.

In the following description, various embodiments of the method of reducing network traffic according to the present invention will be described in detail, referring to the accompanying drawings.

FIG. 1 shows a schematic diagram of a ring topology network system according to the first embodiment of the invention.

Referring to FIG. 1, a first node (C) is a source node and there is a plurality of next nodes (D, E, F, G, H, I, and J). The first node (C) as the source node receives frame from outer node (not depicted) and generate 2 duplicated frame copies of the received frame. The first node (C) can forward a first one of the frame copies to the left side through a first port, and a second one of the frame copies to the right side through a second port. Each frame copy has a tag including information such as Sequence Number for identification. And forwarding includes conceptually unicast and broadcast.

According to the first embodiment of the present invention, the first node can generate the frame copies and then forward them to the next node (D and J).

The next nodes (D, E, F, G, H, I, and J) can receive the frame copy and transfer it to the next node, and especially receive only one of the frame copies. According to the first embodiment of the present invention, the next nodes (D, E, F, G, H, I, and J) can receive and transfer the frame copy.

Hereinafter, the process for transferring frame copies in the ring topology network is described as follows.

The first node (C) forwards the first frame copy to the next node (J) and the second frame copy to the next node (D). Thus, the first node (C) can forward the frame copy through all the channels connected to it.

The next node (J) identifies the first frame copy forwarded by checking the tag of the first frame copy and forwards it to the next node (I), the next node (D) identifies the second frame copy forwarded by checking the tag of the second frame copy and forwards it to the next node (E). In this case, each of the next nodes (D and J) can comprise one port for receiving the frame copy and another port for forwarding the frame copy.

The next node (J) forwards the first frame copy to the next node (I), and the next node (D) forwards the second frame copy to the next node (E). Also, the next node (J) forwards the first frame copy to the next node (H), and the next node (E) forwards the second frame copy to the next node (F).

If it is assumed that the first node (C) forwarded the frame copies simultaneously, the frame copies substantially simultaneously reaches to the next node (G) in spite of some delay. At this time, the method for reducing network traffic of the present invention uses the following processes for traffic reduction.

In the first case in which the first frame copy and the second frame copy are error-free, the traffic reduction method is described as follows.

The arrival of the first frame copy to the next node (G) means that the next nodes (J, I and H) have also received the first frame copy. Also, the arrival of the second frame copy to the next node (G) means that the next nodes (D, E and F) have also received the second frame copy. Therefore, since the next nodes (J, I and H) have already received the first frame copy, they do not need to receive the second frame copy, and since the next nodes (D, E and F) have already received the second frame copy, they do not need to receive the first frame copy.

According to the first embodiment of the present invention, since the next node (H) already received the first frame copy, if the next node (H) receives the second frame copy from the next node (G), it discards the second frame. Specifically, the next node (H) receives the second frame copy and analyzes the tag of it. And if the result of the analysis indicates that the second frame copy is identical to the first frame copy, the next node (H) discards the second frame copy. The tag indicates the frame copy and can be included in a header of the second frame copy as sequence number. If the next node (H) discards the second frame copy, the other next nodes (I and J) cannot receive the second frame copy.

Also, since the next node (F) has already received the second frame copy, if the next node (F) receives the first frame copy from the next node (G), it discards the first frame. Specifically, the next node (F) receives the first frame copy and analyzes the tag of it. And if the result of the analysis indicates that the first frame copy is identical to the second frame copy, the next node (F) discards the first frame copy. If the next node (F) discards the first frame copy, the other next nodes (E and D) cannot receive the first frame copy.

In short, the next nodes (D, E, F, H, I and J) receives only one of the two frame copies and forwards the received frame copy to the next node. Thus, the network traffic can be reduced while implementing the dual system, etc.

According to the other embodiment of the present invention, if the frame copies arrive at the next node (G) at different times, the next node (G) can discard one received later among the first frame copy and the second frame copy. For example, when the first frame copy reaches the next node (G) earlier than the second frame copy, the next node (G) can discard the second frame copy received later and forward the first frame copy to the next node (F). Of course, since the next node (F) has already received the second frame copy identical to the first frame copy, it discards the first frame copy forwarded from the next node (G).

According to another embodiment of the present invention, the first node (C) can forward the frame copies not simultaneously but sequentially. As a result, the frame copies reach the next node (G) at different times, not at the same time; the next node (G) can discard the frame copy which reaches later.

Next, the operations of the network system according to the present invention and a conventional network system using standard HSR are compared.

In the conventional network system using Standard HSR, if a source node outputs frame copies, the frame copies are circulated through the ring topology network and then returned back to the source node. Thus, all the other nodes except for the source node will consume the first copy from the sent frame and store the second copy of the same frame. This process will generate extra network traffic.

However, in the network system using Standard HSR according to the present invention, since the next nodes accepts only one frame copy, the network traffic can be significantly reduced, compared to the conventional network system.

Now, in the second case in which one of the first frame copies has error, the traffic reduction method is described as follows. Assume that the first frame copy has an error on the way from the first node (C) to the next node (J) and the second frame copy is error-free.

The first node (C) forwards the first frame copy to the next node (J), and the next node (J) determines whether the first frame copy forwarded is error-free or bad(has an error). If the next node (J) determines that the first frame copy has an error, then it discards the first frame copy. As a result, the first frame copy cannot be transferred to the other next nodes (I, H, G, F, E and D). On the other hand, the second frame copy which is error-free is transferred by the first node (C), then sequentially passes through the next nodes (D, E, F, G, H, I and J) and is returned back to the first node (C).

In short, even though some of the frame copies have an error, the next nodes (I, H, G, F, E and D) can receive only one frame copy, thus resulting in the network traffic reduction.

In the conventional network system the operating method of the nodes has not been suggested in case of such an error.

Figure 2:
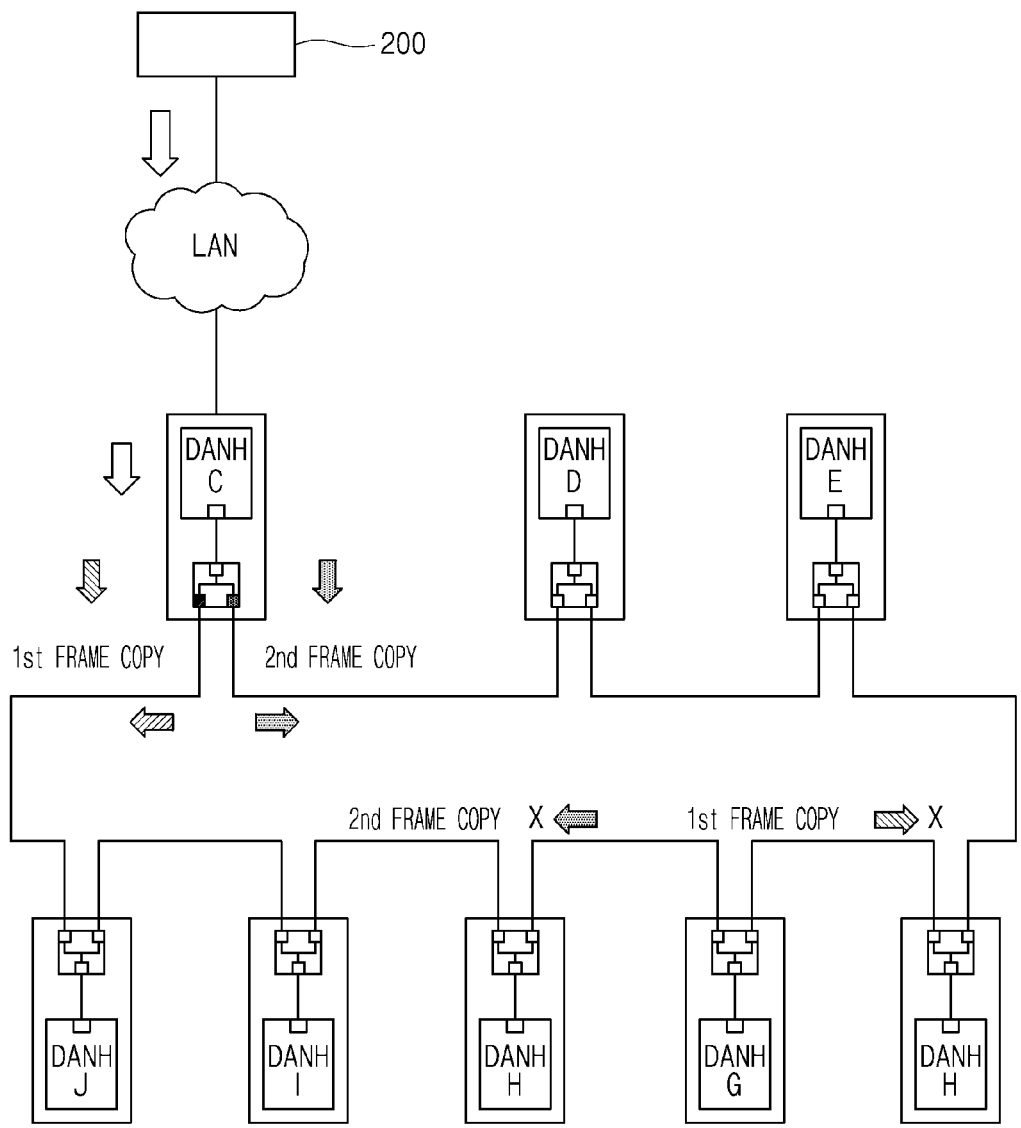
FIG. 2 shows a schematic diagram of the network system according to the second embodiment of the invention.

FIG. 2 shows a schematic diagram of the network system according to the second embodiment of the invention.

Referring to FIG. 2, the network system includes a source node (200), a first node (C) and next nodes (D, E, F, G, H, I and J). Thus in this embodiment, unlike the first embodiment, the first node (C) does not serve as source node, and there exists the separate source node (200).

Even though the first node (C) is not a source node, it can receive a frame copy, generate a plurality of frame copies, and forward the frame copies to the next nodes (D, E, F, G, H, I and J) connected to itself. Thus the first node (C) performs as a distribution node.

Of course, the method of reducing network traffic according to the present invention, the next nodes (D, E, F, G, H, I and J) can be controlled to receive only one frame copy, like the first embodiment.

Figure 3:
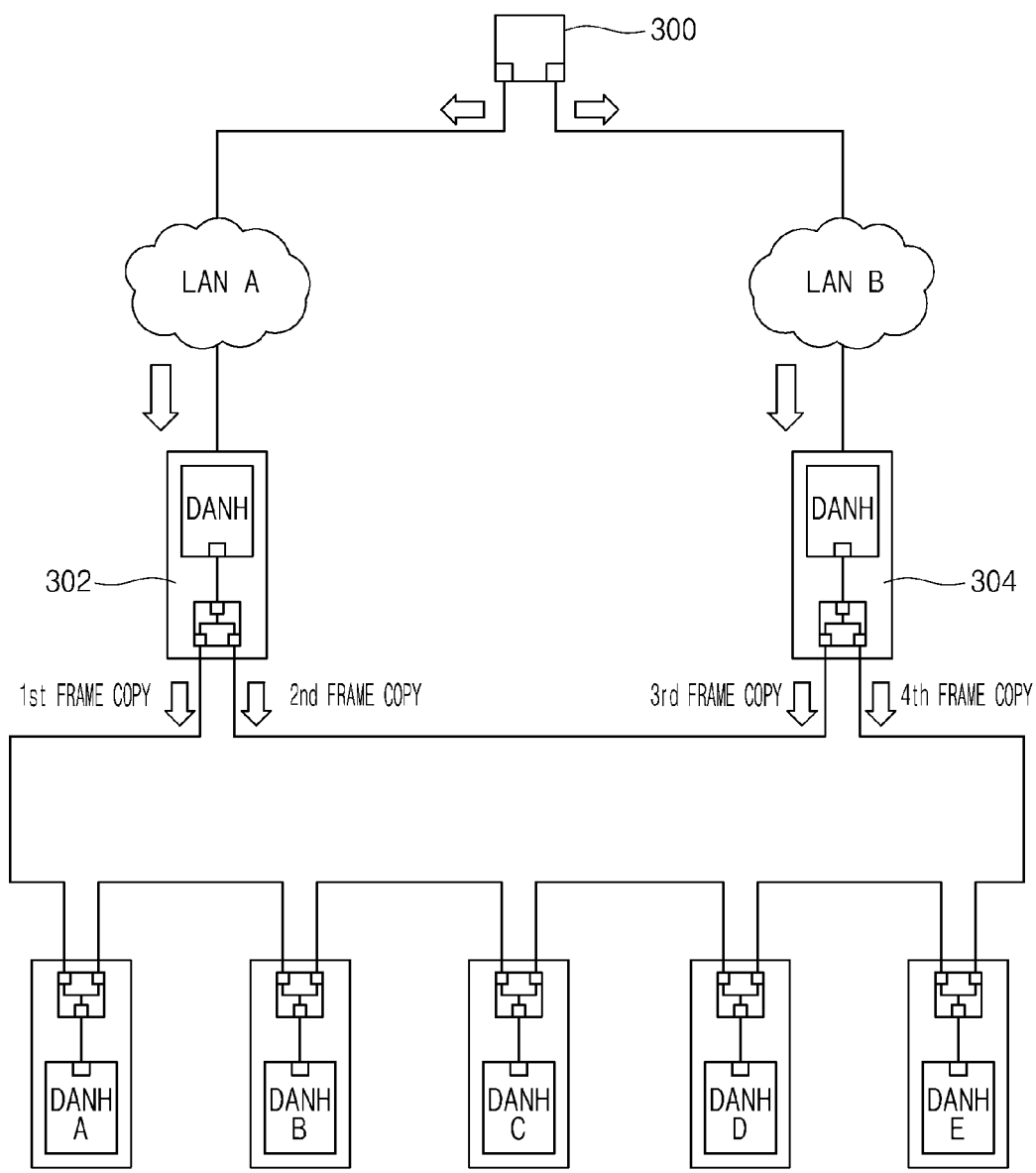
FIG. 3 shows a schematic diagram of the network system according to the third embodiment of the invention.

FIG. 3 shows a schematic diagram of the network system according to the third embodiment of the invention.

Referring to FIG. 3, the network system includes a source node (300), first nodes (302 and 304) and next nodes (A, B, C, D and E).

The source node (300) sends a frame to the first node (302) through the first network, such as LAN A, and also sends the frame identical to the frame sent to the first node (302) to the first node (304) through the second network, such as LAN B. Here, first nodes (302 and 304) can perform as distribution nodes.

The first node (302) duplicates the frame transferred from the source node (300) to generate a first frame copy and a second frame copy, and forwards the first frame copy to the left side and the second frame copy to the right side.

The first node (304) duplicates the frame transferred from the source node (300) to generate a third frame copy and a fourth frame copy, and forwards the third frame copy to the left side and the fourth frame copy to the right side.

In this configuration, if the second frame copy is forwarded to the first node (304), the first node (304) discards the second frame copy after its reception of the second frame copy, because it has already forwarded the fourth frame copy. Similarly, the first node (302) discards the third frame copy after its reception of the third frame copy, because it has already forwarded the first frame copy. As a result, the next nodes (A, B, C, D, and E) can receive only the first frame copy and/or the fourth frame copy. Also like the first embodiment, the next nodes (A, B, C, D, and E) can receive only one among the first frame copy and the fourth frame copy to reduce network traffic.

In short, referring to FIGS. 1-3, in the method of the network traffic reduction according to the present invention, the next nodes receiving the frame copy can be controlled to receive only one of the frame copies.

Here, the network traffic according to the present invention is compared to the traffic in the network in which nodes receive all the plurality of frame copies. For brief explanation, the traffic reduction in the network of FIG. 1 is described.

Figure 4:
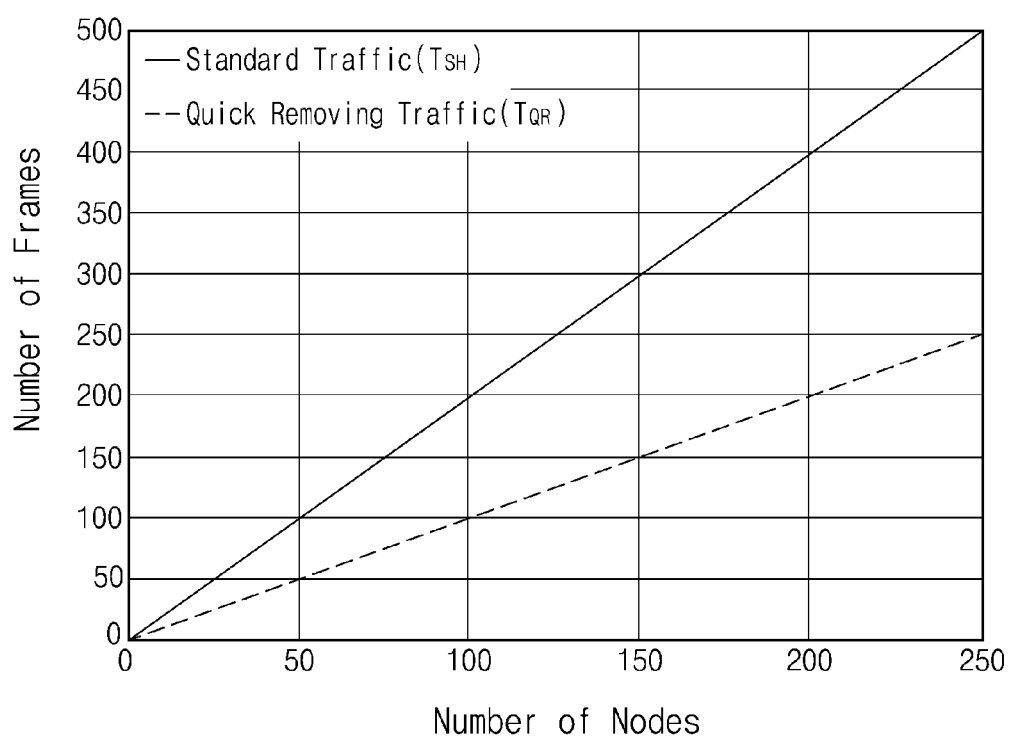
FIG. 4 and FIG. 5 show plots to compare the traffic in the network according to the present invention with the traffic in a network in which nodes receive all the frame copies.
Figure 5:
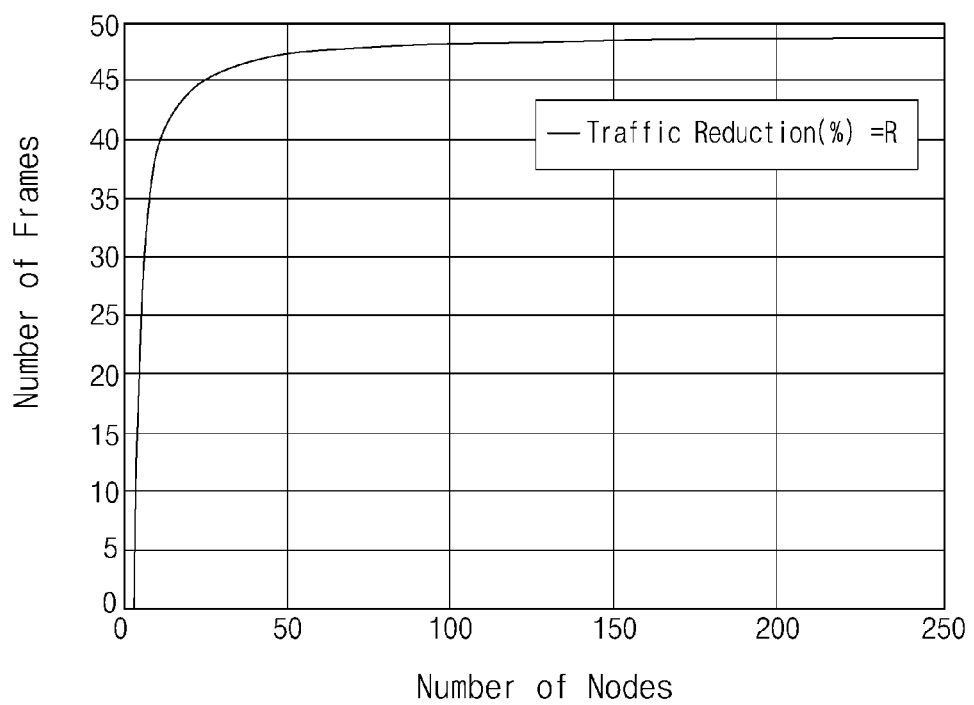

FIG. 4 and FIG. 5 show plots to compare the traffic in the network according to the present invention with the traffic in a network in which nodes receive all the frame copies.

As shown in FIG. 4, while the traffic in the ring topology network structure in which nodes receive all the frame copies is proportional to the number (N) of nodes, the traffic in the network in which nodes receive only one frame copy according to the present invention is proportional to half (N/2) of the number (N) of nodes. Thus, the network traffic according to the present invention is considerably reduced.

As shown in FIG. 5, the traffic reduction in the ring topology network structure is proportional to the number (N) of nodes.

In FIG. 1, in case that both the first frame copy and the second frame copy simultaneously reach the next node (G), 37.5% reduction in network traffic is achieved by the network traffic reduction method of the present invention, compared to the conventional network in which nodes receive all the frame copies.

Figure 6:
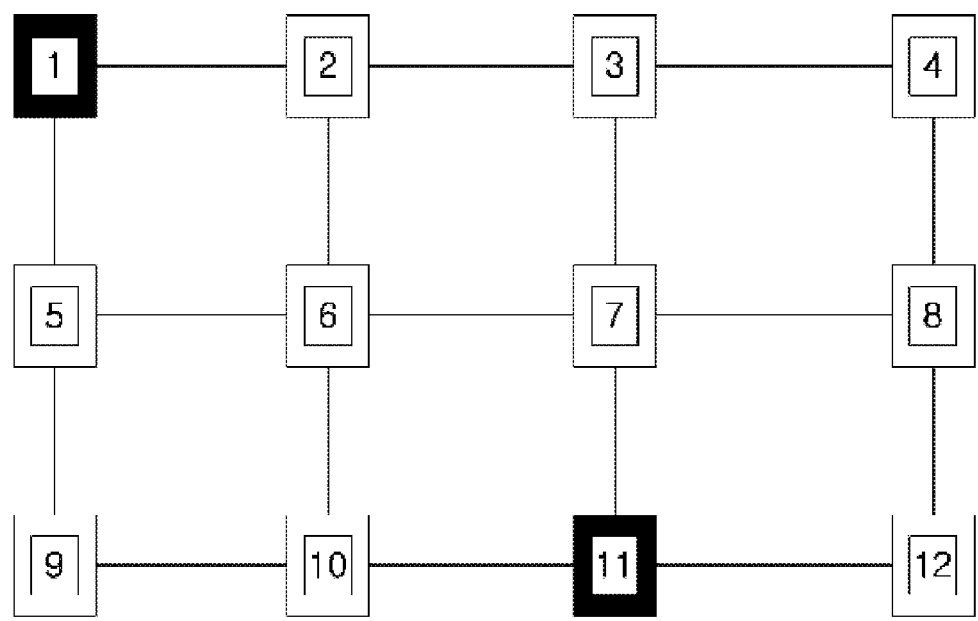
FIG. 6 and FIG. 7 show schematic diagrams of the network system according to the fourth embodiment of the invention.
Figure 7:
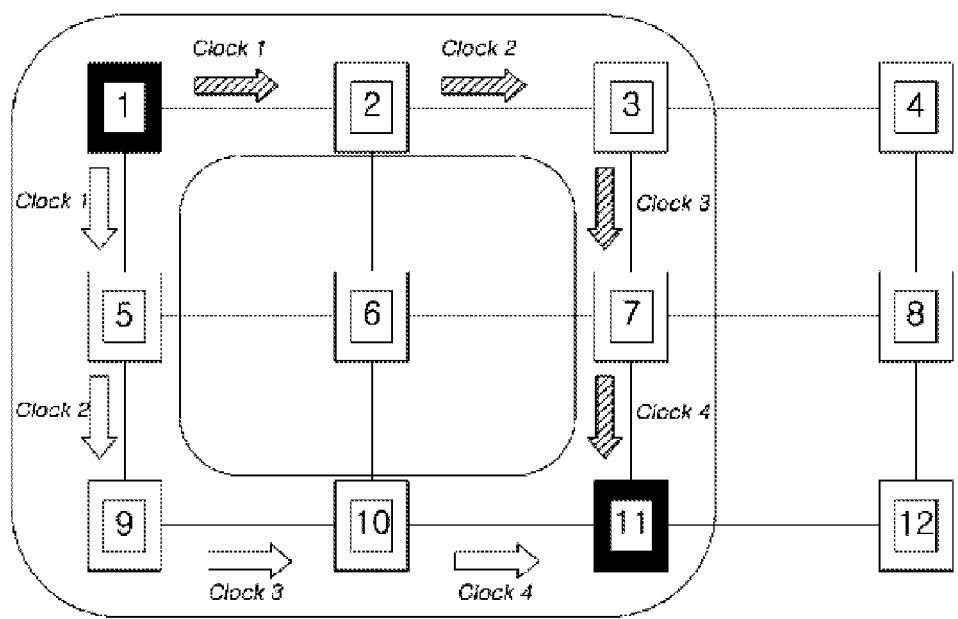

FIG. 6 and FIG. 7 show schematic diagrams of the network system according to the fourth embodiment of the invention.

Referring to FIG. 6, the network system according to this embodiment has a matrix type of network and comprises a plurality of nodes (1-12).

The nodes (1-12) have a matrix structure and individual node sends a relevant frame copy to their adjacent nodes through a plurality of paths. As a result, the network traffic can increase.

Therefore, the network traffic reduction method of the present invention suggests the following method to reduce the network traffic. For easier explanation, it is assumed that the node (1) is a source node or a distribution node which duplicates a received frame to generate a first frame copy and a second frame copy, and the node (11) is a destination at which the frame copies reach.

In the network traffic reduction method of the present invention, some of nodes (1-12) are established as a group. For example, as indicated in FIG. 7, the nodes (1, 2, 3, 7, 11, 10, 9, and 5) are configured to be as one group of nodes. Thus, a new ring topology network is configured to transfer the frame copies.

Once the group of nodes is established, the frame copies are transferred to the destination node (11) by only the nodes (2, 3, 7, 5, 9 and 10) inside the group. More specifically, the node (1) forwards the first frame copy to the node (5), and the second frame copy to the node (2). The node (2) receives the second frame copy and forwards the received frame copy to the node (3).

According to an exemplary embodiment of the present invention, the node (2), by referring to the path table stored in it, can forward the second frame copy to the node (3) which is set as a following connection node. If the group of nodes had not been established, the node (2) would forward the second frame copy to all the adjacent nodes (3 and 6) connected to it. However, according to the present invention, the node (2) transfers the second frame copy only to the node (3) which is a member of the group.

According to another exemplary embodiment of the present invention, the node (2) can analyze the second frame copy to detect the following node (3) to which the frame copy is transferred, and then forward the second frame copy to the node (3). That is, the second frame copy has the information about (node information) nodes (1, 2, 3, 7, 11, 10, 9, and 5) of the group, and the node (2) can determine the following node to which the second frame copy is transferred by analyzing the node information included in the second frame copy.

The nodes (3, 7, 5, 9 and 10) can forward the relevant frame copy in the same way that the node (2) does. As a result, the first frame copy forwarded from the node (1) is transferred to the destination node (11) by the nodes (5, 9, and 10) and the second frame copy forwarded from the node (1) is transferred to the destination node (11) by the nodes (2, 3, and 7).

In short, in case the network system is of matrix type topology, the network traffic reduction method according to the present invention comprises steps of dividing all the nodes into some groups of nodes and transferring the frame copies only through the nodes which are members in a particular group. Surely, each node of the group may not receive a plurality of frame copies but only one frame copy.

In the network structure shown in FIG. 6, the traffic is reduced at least by 53% compared to the case of using all the network links during the standard HSR process. That is, considerable traffic reduction is achieved.

In the exemplary embodiment above, the destination node was set. However, in case the destination is not set, the nodes (2, 3, 7, 11, 10, 9, and 5) of the group discard the latter one of the frame copies like the first embodiment of the present invention.

Although it was not described above, a node in a group does not forward a frame copy to another node which is not a member of the group, but can receive a frame copy from other adjacent node which is not a member of the group. For example, even though the node (7) has been connected to the nodes (6 and 8) which are not members of the group, it does not forward the frame copies to them, but can receive a frame copy from them.

INDUSTRIAL APPLICABILITY

The embodiments of the present invention described in the above were disclosed just to illustrate the preferred examples of the present invention and did not intend to limit the scope of this invention. A person having a skill in the art can make various modifications, varieties, changes and additions of these embodiments under the idea and scope of the present invention. And all the modifications, varieties, changes and additions should be construed as falling into the scope of the claims added in this description.

What is claimed is:

1. A method of reducing network traffic, the method comprising:
receiving, by a first node, a frame from a source node, and generating, by the first node, a first frame copy and a second frame copy by duplicating the frame;
receiving, by a second node, the frame from the source node, and generating, by the second node, a third frame copy and a fourth frame copy by duplicating the frame;
forwarding, by the first node, the first frame copy to a left side and the second frame copy to a right side thereof, wherein the second frame copy being forwarded to the second node;
forwarding, by the second node, the third frame copy to the left side and the fourth frame copy to the right side thereof, wherein the third frame copy being forwarded to the first node;
receiving, by a next node, the first frame copy and the fourth frame copy;
discarding, by the second node, the second frame copy from the first node;
discarding, by the first node, the third frame copy from the second node;
discarding, by the next node, a frame copy received later among the first frame copy and the fourth frame copy.

2. The method of reducing network traffic according to claim 1, wherein the first node, the second node and the next node are included in a ring topology network using HSR (High-availability Seamless Redundancy).

3. The method of reducing network traffic according to claim 1, the method further comprising:
analyzing, by the next node, a tag of the first frame copy to detect where the first frame copy is duplicated; and
analyzing, by the next node, a tag of the fourth frame copy to detect where the fourth frame copy is duplicated.

4. The method of reducing network traffic according to claim 1, the method further comprising:
forwarding, by the next node, a framed copy received earlier among the first frame copy and the fourth frame copy to its adjacent node, wherein the next node includes ports for receiving and forwarding the frame copies.

5. A method of reducing network traffic, the method comprising:
receiving, by a first node, a frame from a source node, and generating, by the first node, a first frame copy and a second frame copy by duplicating the frame;
receiving, by a second node, the frame from the source node, and generating, by the second node, a third frame copy and a fourth frame copy by duplicating the frame;
forwarding, by the first node, the first frame copy to a left side and the second frame copy to a right side thereof, wherein the second frame copy being forwarded to the second node;
forwarding, by the second node, the third frame copy to the left side and the fourth frame copy to the right side thereof, wherein the third frame copy being forwarded to the first node;
receiving, by a next node, the first frame copy and the fourth frame copy;
discarding, by the second node, the second frame copy from the first node;
discarding, by the first node, the third frame copy from the second node;
discarding, by the next node, one of the first frame copy and the fourth frame copy, if said one of the first frame copy and the fourth frame copy has an error; and
forwarding, by the next node, the other one of the first frame copy and the fourth frame copy which does not have the error to its adjacent node.

6. The method of reducing network traffic according to claim 5, wherein each of the first frame copy and the fourth frame copy includes a tag indicating where said each of the copies is duplicated, and
the first node, the second node and the next node are included in a ring topology network using HSR (High-availability Seamless Redundancy).

7. A method of reducing network traffic, the method comprising:
receiving, by a first node, a frame from a source node, and generating, by the first node, two first frame copies by duplicating the frame;
receiving, by a second node, the frame from the source node, and generating, by the second node, two second frame copies by duplicating the frame;
forwarding, by the first node, said two first frame copies to a left side and a right side thereof, respectively;
forwarding, by the second node, said two second frame copies to a left side and a right side thereof, respectively;
receiving, by a next node, one of said two first frame copies from the first node and one of said two second frame copies from the second node;
discarding, by the second node, the other one of said two first frame copies from the first node;
discarding, by the first node, the other one of said two second frame copies from the second node;
discarding, by the next node, a frame copy received later among the one of said two first frame copies from the first node and the one of said two second frame copies from the second node.

8. The method of reducing network traffic according to claim 7, wherein the first node, the second node and the next node are included in a ring topology network using HSR (High-availability Seamless Redundancy).

9. The method of reducing network traffic according to claim 8, the method further comprising:
analyzing, by the next node, a tag of the one of said two first frame copies to detect where the one of said two first frame copies is duplicated; and
analyzing, by the next node, a tag of the one of said two second frame copies to detect where the one of said two second frame copies is duplicated.

10. The method of reducing network traffic according to claim 8, the method further comprising:
forwarding, by the next node, a frame copy received earlier among the one of said two first frame copies and the one of said two second frame copies to its adjacent node, wherein the next node includes ports for receiving and forwarding the frame copies.

* * * * *